(12) United States Patent
Gu et al.

(10) Patent No.: US 11,537,441 B2
(45) Date of Patent: Dec. 27, 2022

(54) METHOD AND APPARATUS FOR BALANCING LOADS, AND COMPUTER-READABLE STORAGE MEDIUM

(71) Applicant: BEIJING BAIDU NETCOM SCIENCE AND TECHNOLOGY CO., LTD., Beijing (CN)

(72) Inventors: Canghai Gu, Beijing (CN); Peng Wu, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 309 days.

(21) Appl. No.: 16/929,970

(22) Filed: Jul. 15, 2020

(65) Prior Publication Data
US 2021/0034421 A1    Feb. 4, 2021

(30) Foreign Application Priority Data
Jul. 29, 2019  (CN) .......................... 201910690754.7

(51) Int. Cl.
*G06F 9/50* (2006.01)
*G06F 1/08* (2006.01)

(52) U.S. Cl.
CPC ............. *G06F 9/505* (2013.01); *G06F 1/08* (2013.01); *G06F 9/5083* (2013.01)

(58) Field of Classification Search
CPC ........... G06F 9/505; G06F 1/08; G06F 9/5083
See application file for complete search history.

(56) References Cited

U.S. PATENT DOCUMENTS

| 5,953,237 A | 9/1999 | Indermaur et al. |
| 9,735,778 B1 | 8/2017 | Schulz |
| 2003/0006806 A1 | 1/2003 | Elappuparackal |

(Continued)

FOREIGN PATENT DOCUMENTS

| GB | 2542215 A | 3/2017 |
| JP | 2007502477 A | 2/2007 |
| WO | 2004107144 A1 | 12/2004 |

OTHER PUBLICATIONS

Office Action for Korean Patent Application No. 10-2020-0045445, dated May 11, 2021, 8 pages.

(Continued)

*Primary Examiner* — Sisley N Kim
(74) *Attorney, Agent, or Firm* — Fay Sharpe LLP

(57) ABSTRACT

Embodiments of the present disclosure relate to a method and apparatus for balancing loads, and a computer-readable storage medium. The method includes: for each data processing unit in a set of data processing units in a data processing system, acquiring current input data of the data processing unit for a current clock cycle and next input data of the data processing unit for a next clock cycle; and determining a first metric value indicating changes in input data of said data processing unit in the next clock cycle based on a comparison between the current input data and the next input data. The method further includes controlling an operating state of the set of data processing units in the next clock cycle based on the first metric value determined for the set of data processing units.

11 Claims, 7 Drawing Sheets

(56) References Cited

U.S. PATENT DOCUMENTS

| | | |
|---|---|---|
| 2006/0248354 A1* | 11/2006 | Pineda De Gyvez ........................ H03K 19/0016 |
| | | 713/300 |
| 2015/0089251 A1 | 3/2015 | Carlson et al. |
| 2015/0220128 A1 | 8/2015 | Barrenscheen et al. |
| 2018/0329471 A1 | 11/2018 | Venkatasubramanian et al. |
| 2019/0187775 A1 | 6/2019 | Rotem et al. |

OTHER PUBLICATIONS

Office Action for Japanese Application No. 2020-117637, dated Aug. 17, 2021, 4 pages.
Extended European Search Report for EP Application No. 20165846.5, dated Sep. 15, 2020, 8 pages.

* cited by examiner

METHOD AND APPARATUS FOR BALANCING LOADS, AND COMPUTER-READABLE STORAGE MEDIUM

CROSS-REFERENCE TO RELATED APPLICATION

The present application is based upon and claims priority to Chinese Patent Application No. 201910690754.7, filed on Jul. 29, 2019, the entirety contents of which are incorporated herein by reference.

TECHNICAL FIELD

Embodiments of the present disclosure relate to a field of computer, and more particularly to a method and apparatus for balancing loads, and a computer-readable storage medium.

BACKGROUND

Artificial intelligence (AI) chips are dedicated to handle a large number of computing tasks in AI applications. Therefore, an AI chip is a kind of calculation-intensive chip, which has a strong computing power and a very large area. Typically, in training and reasoning applications, it very easy that hundreds of millions of transistors hop from idle state to active state at the same time and instantaneous power consumption of chips is extremely large, resulting in great challenges to power supply of chips at this moment. It is very easy to have a transient voltage drop, which leads to logic upset inside the entire chip and cannot work normally in serious cases. Conversely, when a large number of transistors hop from active state to idle state at the same time, it will occur an instantaneous voltage overshoot, which will also cause damage to power supply network. These problems are difficult to solve through subsequent software optimization, and have gradually become very serious problems in large-area and high-power chips.

SUMMARY

According to an exemplary embodiment of the present disclosure, an improved solution for balancing loads is provided.

In Embodiments of the present disclosure, a method for balancing loads is provided. The method may include: for each data processing unit in a set of data processing units in a data processing system, acquiring current input data of the data processing unit for a current clock cycle and next input data of the data processing unit for a next clock cycle; and determining a first metric value indicating changes in input data of the data processing unit in the next clock cycle based on a comparison between the current input data and the next input data; and controlling an operating state of the set of data processing units in the next clock cycle based on the first metric value determined for the set of data processing units.

In Embodiments of the present disclosure, an apparatus for balancing loads is provided. The apparatus may include: one or more processors; a memory storing instructions executable by the one or more processors; in which the one or more processors are configured to: acquire current input data of the data processing unit for a current clock cycle and next input data of the data processing unit for a next clock cycle, for each data processing unit in a set of data processing units in a data processing system; determine a first metric value indicating changes in input data of the data processing unit in the next clock cycle based on a comparison between the current input data and the next input data, for each data processing unit in the set of data processing units; and control an operating state of the set of data processing units in the next clock cycle based on the first metric value determined for the set of data processing units.

In Embodiments of the present disclosure, a computer-readable storage medium is provided, in which the computer-readable storage medium has a computer program stored thereon, when the computer program is executed by a processor, a method for balancing loads is implemented. The method includes: for each data processing unit in a set of data processing units in a data processing system, acquiring current input data of the data processing unit for a current clock cycle and next input data of the data processing unit for a next clock cycle; and determining a first metric value indicating changes in input data of the data processing unit in the next clock cycle based on a comparison between the current input data and the next input data; and controlling an operating state of the set of data processing units in the next clock cycle based on the first metric value determined for the set of data processing units.

It should be understood that the content described in the summary is neither intended to limit key or important features of embodiments of the present disclosure, nor to limit the scope of the present disclosure. Other features of the present disclosure will become readily understood from the following description.

BRIEF DESCRIPTION OF THE DRAWINGS

The above and other features, advantages, and aspects of various embodiments of the present disclosure will become more apparent in conjunction with the accompanying drawings by reference to following detailed description. In the drawings, the same or similar elements are denoted by the same or similar reference numerals, in which.

DETAILED DESCRIPTION

Figure 1:
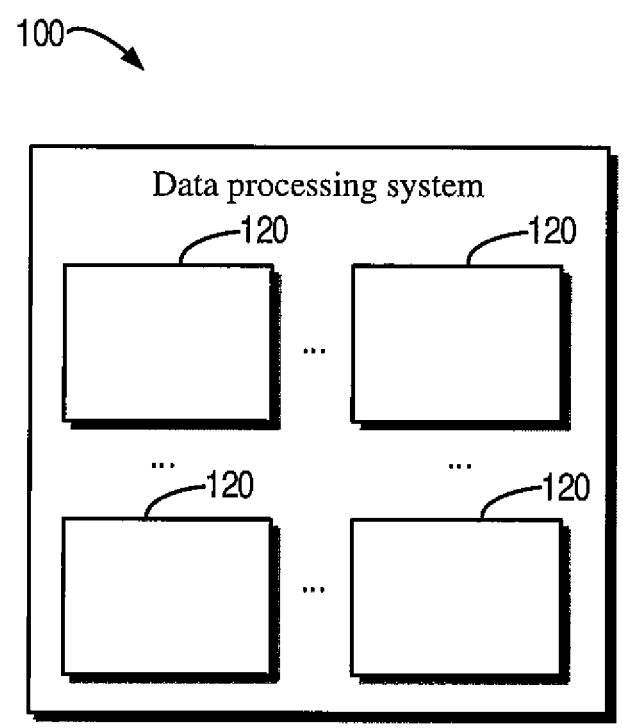
FIG. 1 shows a schematic diagram of an exemplary data processing system in which embodiments of the present disclosure may be implemented.

Embodiments of the present disclosure will be described in more detail below with reference to the accompanying drawings. Although some embodiments of the present disclosure are shown in the drawings, it should be understood that the present disclosure may be implemented in various forms and should not be construed as limited to the embodiments set forth herein, but rather these embodiments are provided for more thoroughly and completely understanding the present disclosure. It should be understood that the drawings and embodiments of the present disclosure are only used for explanatory purposes, but not to limit the protection scope of the present disclosure.

In the description of embodiments of the present disclosure, the term "including" and similar wordings should be understood as openly including, that is, "including but not limited to". The term "based on" should be understood as "based at least in part on". The term "one embodiment" or "the embodiment" should be understood as "at least one embodiment". The terms such as "first", "second" and the like may refer to the different or same objects. Other explicit and implicit definitions may be included hereafter. In the description of embodiments of the present disclosure, "chip", "system on chip" and "integrated circuit" are used interchangeably.

Embodiments of the present disclosure will be described in particular below with reference to the accompanying drawings.

FIG. 1 shows a schematic diagram of an example data processing system 100 in which embodiments of the present disclosure may be implemented. According to some embodiments of the present disclosure, the data processing system 100 may be a system on chip. According to some embodiments of the present disclosure, the data processing system 100 may be an AI chip. For example, it is used to perform data calculation and storage related to inference, training and the like. In some alternative embodiments, the data processing system 100 may be other chips except for an AI chip. For example, embodiments of the present disclosure are in particular suitable to a chip with a large area and high power consumption for data processing.

As shown in FIG. 1, the data processing system 100 may include several data processing units 120. Although four data processing units 120 are shown in the figure, it should be understood that the number of data processing units 120 is not limited to this, but may be any number of more or less.

According to some embodiments of the present disclosure, these data processing units 120 may have the same data processing function. For example, the data processing units 120 may each be a MAC unit for performing a multiply-adder (MAC) operation, and form a MAC unit array. In some alternative embodiments, these data processing units 120 may have different data processing functions. For example, some data processing units 120 may be MAC units, while the other data processing units 120 may be units with other data processing functions except for performing MAC operations. It should be understood that the above-mentioned MAC is merely an example, and the data processing units 120 may be data processing units for implementing any suitable data processing functions known in the art or developed in the future, which is not limited in the present application.

When a large number of transistors in these data processing units 120 hop from idle state to active state or from active state to idle state at the same time during operation, instantaneous power consumption in the data processing system 100 will be extremely large, resulting in severe damage to power supply for data processing system 100 at this moment.

In some existing solutions, the impact on instantaneous high power consumption is mitigated by enhancing the power supply network and using more ultra-large capacitors inside the package and on the printed circuit board (PCB). However, the costs for high-density capacitors are very expensive and affect final packaging and PCB size. In addition, it is impossible to increase capacitance indefinitely being subject to the limitations on packaging and PCB space. The simulation indicates that when the capacitance is increased to a certain degree, the problem of instantaneous high current cannot be further improved even if more capacitance is increased.

In some other existing solutions, a pulsation array is employed to achieve the effects of gradual initiation and gradual ending, thus reducing instantaneous high power consumption. However, the pulsating array may only effectively slow down instantaneous current at the initiating and ending times without avoiding instantaneous high current that occurs during the operation of chips. It also adds delay to the entire array.

In view of this, the inventor proposes to consider the controlling of instantaneous power consumption at the beginning of designing chips, and it automatically predicts and adjusts in advance instantaneous power consumption using a series of feedback mechanisms, thereby effectively controlling the changes in instantaneous voltage. Detailed description is made below in conjunction with FIG. 2.

Figure 2:
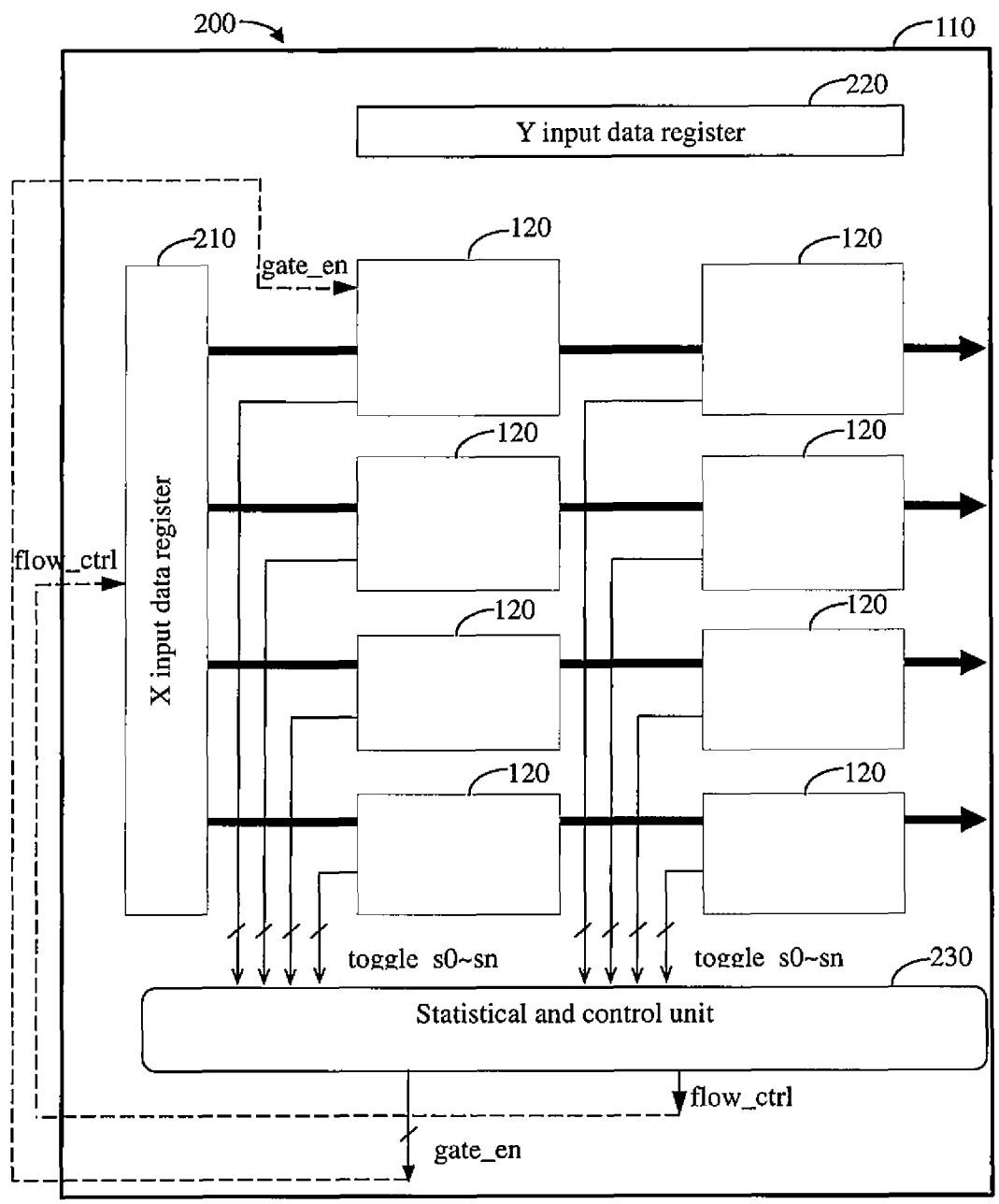
FIG. 2 shows a schematic diagram of a concept for balancing loads according to an embodiment of the present disclosure.

FIG. 2 shows a schematic diagram 200 of a concept for balancing loads according to an embodiment of the present disclosure. For convenience, the following description will be made in combination with the data processing system 100 of FIG. 1. According to some embodiments of the present disclosure, the data processing units 120 may have a set of input data. In some alternative embodiments, the data processing units 120 may have two or more sets of input data. As shown in FIG. 2, the data processing units 120 may acquire X input data and Y input data from X input data register 210 and Y input data unit 220, respectively. As an example, the acquisition for X input data is only shown in FIG. 2.

According to embodiments of the present disclosure, the statistical and control unit 230 may monitor changes in input data between the current clock cycle and next clock cycle of each data processing unit 120 (for example, as shown by toggle s0~sn in FIG. 2), and determine the loads condition of the entire chip 100 in the next clock cycle according to the changes. Then, the operating state of each data processing unit 120 in the next clock cycle is controlled according to the loads condition. For example, by the clock control signal of gate_en and data flow control signal of flow_ctrl shown in FIG. 2. For the sake of brevity, gate_en is shown herein only for one data processing unit 120, but in fact each data processing unit 120 may be controlled by gate_en. Moreover, flow_ctrl is shown herein only for X input data register 210, but in fact the operation of Y input data register 220 may also be controlled by flow_ctrl. Thus the loads may be adjusted to reduce instantaneous high power consumption.

According to an embodiment of the present disclosure, the statistical and control unit 230 may be implemented in the form of software, hardware, firmware or any combination thereof. The following describes in more detail in conjunction with FIG. 3 to FIG. 7.

Figure 3:
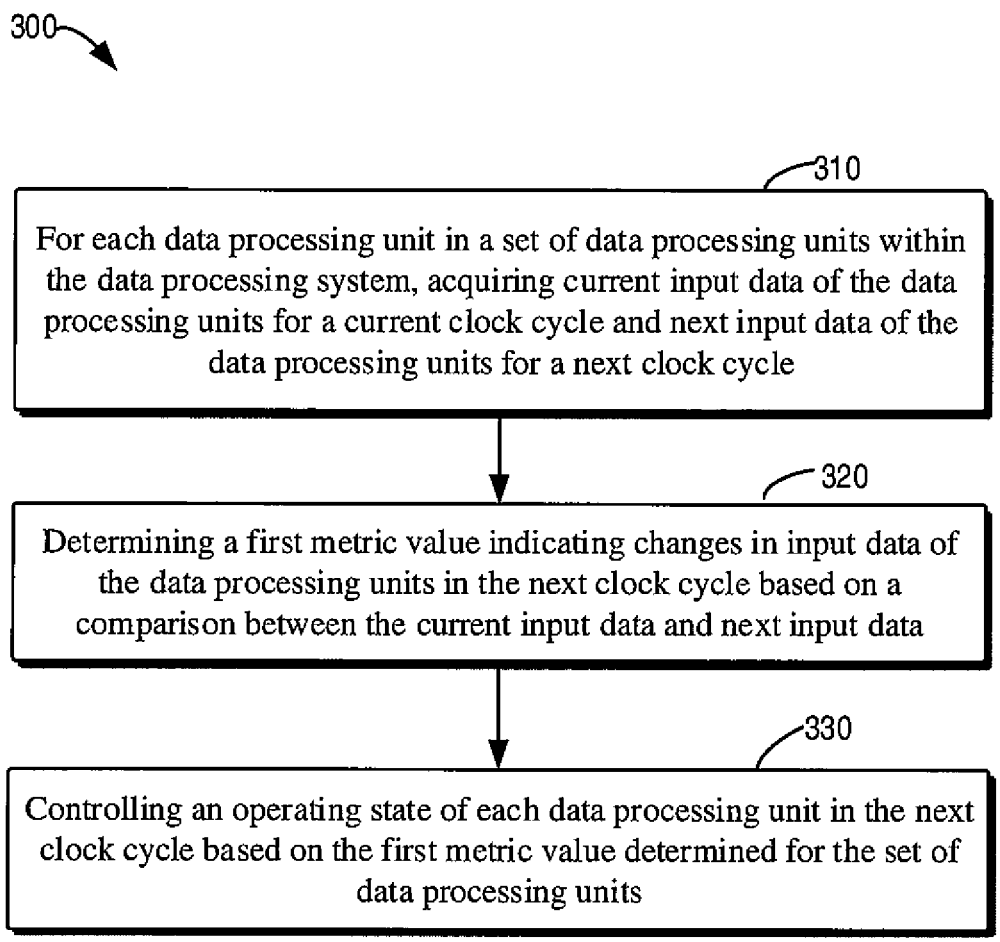
FIG. 3 a flow chart of a method for balancing loads according to an embodiment of the present disclosure.

FIG. 3 shows a flow chart of a method 300 for balancing loads according to an embodiment of the present disclosure. For convenience, the following description will be made in conjunction with environments of FIG. 1 and FIG. 2. The method 300 may be implemented in any data processing system (e.g., the data processing system 100 of FIG. 1), for example, implemented at the statistical and control unit 230 of FIG. 2.

As shown in FIG. 3, at block 310, for each data processing unit in a set of data processing units 120 in the data processing system 100, acquiring current input data of the data processing units for a current clock cycle and next input data of the data processing units for a next clock cycle. According to some embodiments of the present disclosure, the set of data processing units 120 may be a part of data processing units 120 in the data processing system 100. In some alternative embodiments, the set of data processing units 120 may be all the data processing units 120 in the data processing system 100.

In an embodiment in which the data processing units 120 have a plurality of sets of input data, at least one set of input data (e.g., X input data shown in FIG. 2) may be selected from multiple sets of input data (e.g., X input data and Y input data shown in FIG. 2) of the data processing units 120. In some embodiments, the at least one set of input data may be randomly selected. In some embodiments, the at least one set of input data may be selected as needed. Then, for each set of input data in the at least one set of input data, the acquisition operations of the current input data and next input data is executed respectively, that is, the current input data and the next input data for each set of input data in the at least one set of input data are acquired respectively.

According to some embodiments of the present disclosure, the current input data may be acquired at an output of input data register 210 or 220 for the data processing units 120, and the next input data may be acquired at an input of input data register 210 or 220. In other words, in some embodiments of the present disclosure, the current input data and the next input data may be acquired at the same time or in sequence. It should be understood that the current input data and next input data may also be obtained by any other suitable method, which is not particularly limited in this application.

At block 320, a first metric value indicating changes in input data of the data processing units 120 in the next clock cycle is determined based on a comparison between the current input data and the next input data. According to some embodiments of the present disclosure, the current input data and next input data may be compared bit by bit to count bits flipping conditions. For example, in some embodiments, a flipped rate of bits may be determined as the first metric value. In some alternative embodiments, a non-flipped rate of bits may be determined as the first metric value. It should be understood that embodiments of the present disclosure are not limited to the above-mentioned counts of bits flipping conditions, and the first metric value may also be determined by any other suitable methods to indicate changes in input data of the data processing units in the next clock cycle.

Figure 4:
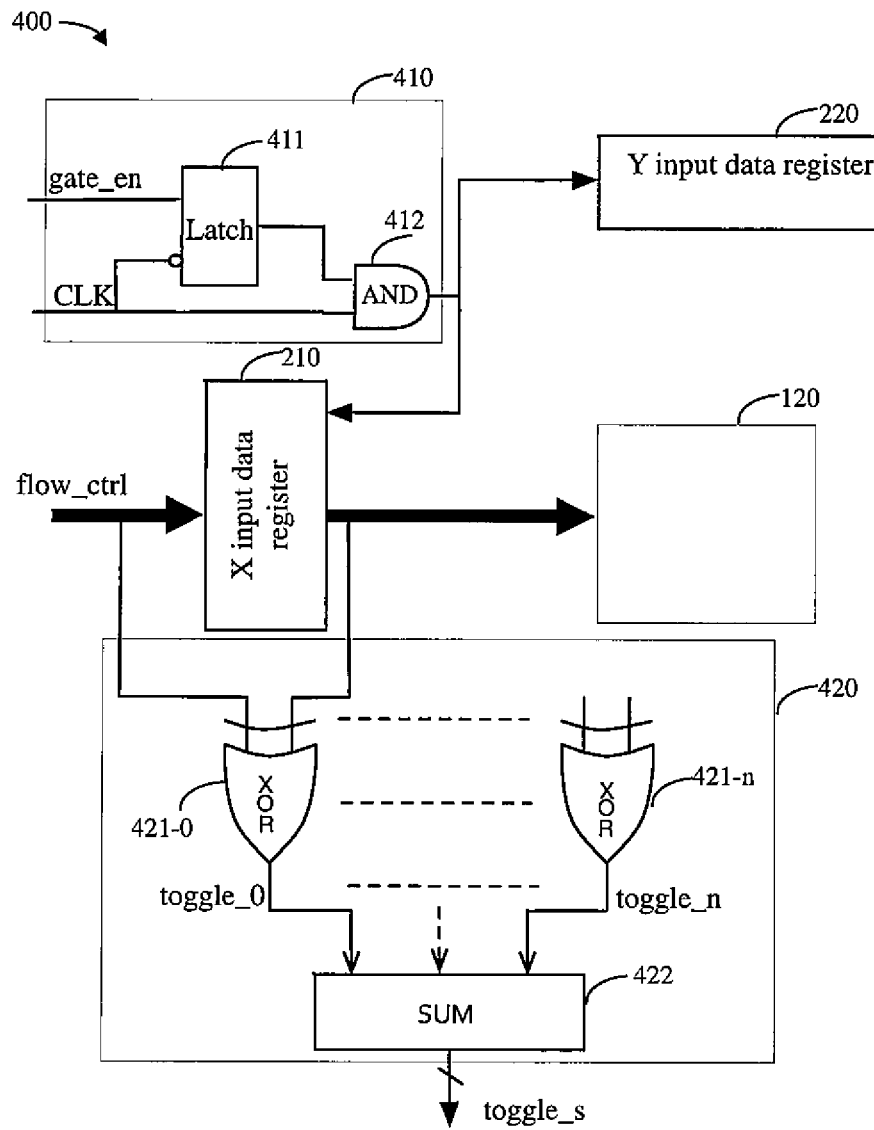
FIG. 4 shows a schematic diagram of an exemplary implementation of the statistical and control unit shown in FIG. 2 according to an embodiment of the present disclosure.

An exemplary implementation about determining the flipped rate of bits as the first metric value is described below in conjunction with FIG. 4. FIG. 4 shows a schematic diagram 400 of an exemplary implementation of the statistical and control unit 230 shown in FIG. 2 according to an embodiment of the present disclosure. As shown in FIG. 4, determination of the flipped rate of bits may be implemented by module 420.

In this embodiment, the current input data for the data processing units 120 in the current clock cycle and the next input data for the data processing units 120 in the next clock cycle may be acquired by monitoring the output and input of X input data register 210, respectively. Exclusive OR operations are executed on n bits (in which, n is a positive integer) corresponding to the current input data and next input data, respectively, using exclusive OR (XOR) circuits 421-0 to 420-n. As a result, n operation results of toggle_0 to toggle_n are obtained. Then, n operation results of toggle_0 to toggle_n are summed by summation circuit (SUM) 422, thereby obtaining the flipped rate of bits toggle_s of the data processing units 120 in the next clock cycle.

According to an embodiment of the present disclosure, the module 420 may be set for each data processing unit 120 to determine the corresponding flipped rate of bits (as shown by toggle_s0 sn in FIG. 2). It should be understood that implementation of the module 420 shown in FIG. 4 is merely an example, and does not constitute any limitation to the present application. The determination of the flipped rate of bits may be implemented in any other suitable manner.

After the first metric value (e.g., toggle_s0~sn) is determined for the set of data processing units 120, return to FIG. 3, and at block 330, an operating state of each data processing unit 120 in the next clock cycle is controlled based on the first metric value determined for the set of data processing units 120. Therefore, the changes in input data of the data processing units 120 in the data processing system 100 may be dynamically controlled based on the actual data, thereby achieving the effects of dynamically balancing instantaneous large current and reducing instantaneous power consumption.

Figure 5:
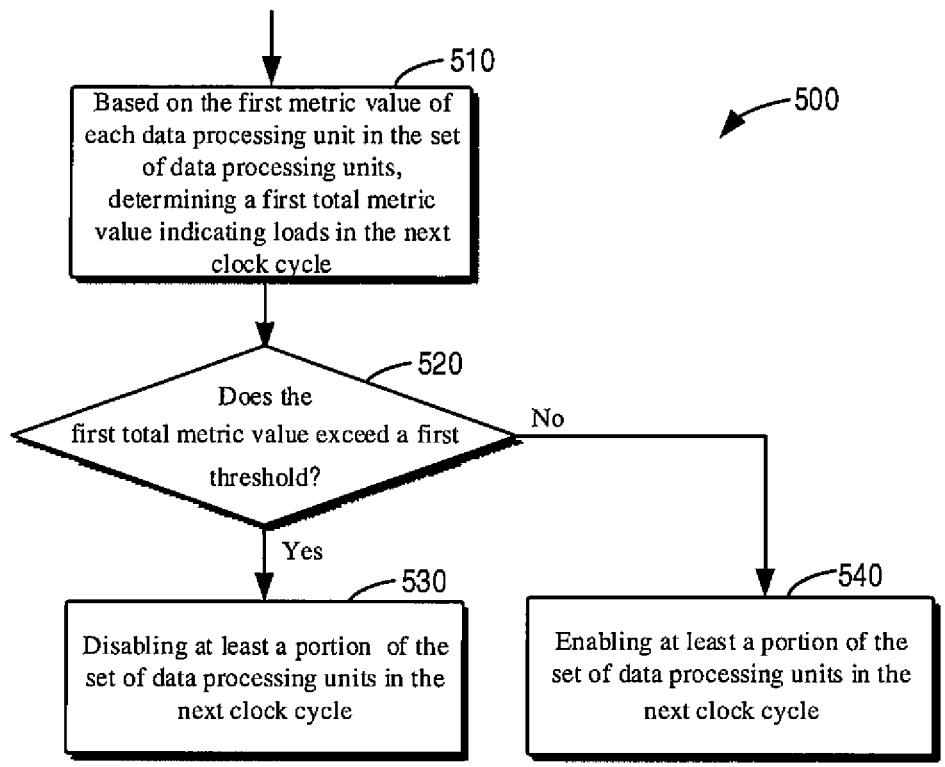
FIG. 5 shows a flow chart of a method for controlling an operating state of a data processing unit according to an embodiment of the present disclosure.

An exemplary implementation of controlling the data processing units based on the first metric value is described below in conjunction with FIG. 5 to FIG. 7. FIG. 5 shows a flow chart of a method 500 for controlling an operating state of data processing units according to an embodiment of the present disclosure. The method 500 may be implemented at the statistical and control unit 230 of FIG. 2.

As shown in FIG. 5, at block 510, a first total metric value indicating loads in the next clock cycle may be determined based on the first metric value determined for the set of data processing units 120. According to some embodiments of the present disclosure, the first total metric value may be determined by summing the first metric value corresponding to each data processing unit in the set of data processing units 120. For example, in a case where the first metric value is a flipped rate of bits, the first total metric value may be a total flipped rate of bits.

It should be understood that other suitable methods may also be used to determine the first total metric value based on the first metric value. For example, according to some alternative embodiments of the present disclosure, weights may be determined for each data processing unit in the set of data processing units 120, and based on the weights, a weighted sum of the first metric values corresponding to each data processing unit in the set of data processing units 120 is performed, to determine the first total metric value. In some embodiments, for example, the weights may be determined according to functions of the data processing units. In some alternative embodiments, for example, the weights may be determined according to the processing capabilities of data processing units. It should be understood that the weights may also be determined in any other suitable manner.

For some application scenarios where total power consumption is limited, e.g., reasoning application scenario, the total power consumption usually needs to be controlled below 75 W. Since the total metric value will affect the total power consumption of chips, a threshold may be set for the total metric value in this application scenario.

At block 520, it is determined whether the first total metric value exceeds a first threshold. According to some embodiments of the present disclosure, the first threshold may be dynamically set. For example, in some embodiments, the first threshold may be configured by data processing system 100. In some embodiments, the first threshold may be manually selected based on experiences. In some alternative embodiments, the first threshold may be predetermined.

If it is determined at block 520 that the first total metric value exceeds the first threshold, then proceed to block 530, at least a portion of the set of data processing units 120 are disabled in the next clock cycle. If it is determined at block 520 that the first total metric value is below the first threshold, then proceed to block 540, at least a portion of the set of data processing units 120 are enabled in the next clock cycle. According to some embodiments of the present disclosure, the at least a portion of the data processing units 120 may be randomly determined from the set of data processing units 120. According to some alternative embodiments of the present disclosure, the at least a portion of the data processing units 120 may be determined based on a comparison between the first metric value and a predetermined threshold (e.g., in a manner described below in combination with FIG. 6).

In some embodiments, the data processing units 120 may be enabled and disabled by a gating circuit. For example, referring to FIG. 4, module 410 may be provided for each data processing unit 120. The module 410 may include a latch 411 and an "and" circuit (AND) 412. A gate signal of gate_en and an active-low clock (CLK) signal may be input to the latch 411. The input of the latch 411 is connected to one input of the AND 412, and the other input of the AND 412 receives a CLK signal. The output of the AND 412 is connected to X input data register 210 and Y input data register 220 for the data processing units 120.

When data processing units 120 need to be disabled, the statistical and control unit 230 may output a low-level gate_en and a low-level flow_ctrl (as shown in FIG. 2). When the next clock cycle of CLK signal comes, the output of AND 412 is a low level. At this time, X input data register 210 and Y input data register 220 are not operated, that is, data will not be supplied to data processing units 120 during this clock cycle, thereby the data processing units 120 being in a disabled state. At the same time, data updates for X input data register 210 and Y input data register 220 are also suspended.

When data processing units 120 need to be enabled, the statistical and control unit 230 may output a high-level of gate_en and a high-level of flow_ctrl. When the next clock cycle of CLK signal comes, the output of AND 412 is a high level. At this time, the data of X input data register 210 and Y input data register 220 are updated in this clock cycle, and X input data register 210 and Y input data register 220 supply the updated data to the data processing units 120 so that the data processing unit 120 is in an enabled state.

In this example, the statistics and control of the metric value (e.g., the flipped rate of bits) may be performed automatically in hardware, so the dynamic control speed is on a nanosecond level. It should be understood that the above-mentioned implementation described in conjunction with the module 410 shown in FIG. 4 is merely as an example, and the present application is not limited thereto, but it may be achieved in any other suitable manner that the control of operating state of data processing units. Through the embodiment of FIG. 5, in addition to solving the problem of instantaneous large current, a control function of total power consumption may also be achieved at the same time.

Figure 6:
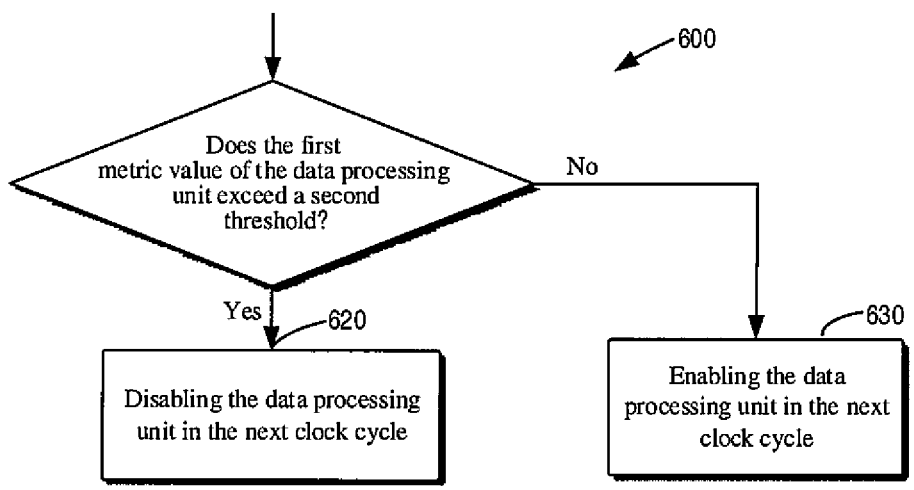
FIG. 6 shows a flow chart of a method for controlling an operating state of a data processing unit according to another embodiment of the present disclosure.

FIG. 6 shows a flow chart of a method 600 for controlling an operating state of data processing units according to another embodiment of the present disclosure. The method 600 may be implemented at the statistical and control unit 230 of FIG. 2. In this embodiment, operations are performed for each data processing unit in the set of data processing units 120. As shown in FIG. 6, at block 610, it is determined whether the first metric value of the data processing unit exceeds a second threshold. According to some embodiments of the present disclosure, the second threshold may be dynamically set. For example, in some embodiments, the second threshold may be configured by the data processing system 100. In some embodiments, the second threshold may be manually selected based on experiences. In some alternative embodiments, the second threshold may be predetermined.

If it is determined at block 610 that the first total metric value of data processing unit exceeds a second threshold, then proceed to block 620, the data processing unit is disabled in the next clock cycle. If it is determined at block 610 that the first total metric value is below the second threshold, then proceed to block 630, the data processing unit is enabled in the next clock cycle. The implementation of disabling and enabling the data processing unit is similar to the foregoing description in conjunction with FIG. 5, which is not repeated herein again.

Figure 7:
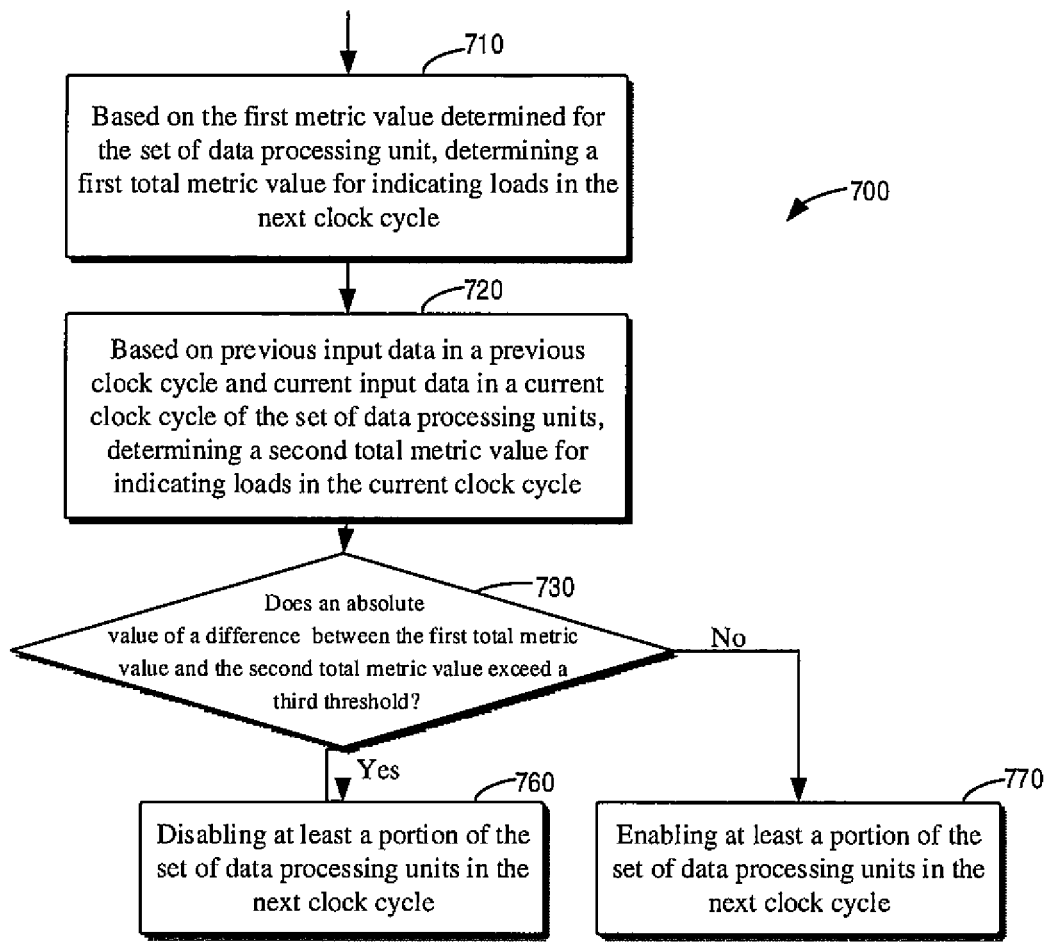
FIG. 7 shows a flow chart of a method for controlling an operating state of a data processing unit according to yet another embodiment of the present disclosure.

FIG. 7 shows a flow chart of a method 700 for controlling an operating state of data processing units according to another embodiment of the present disclosure. The method 700 may be implemented at the statistical and control unit 230 of FIG. 2.

As shown in FIG. 7, at block 710, a first total metric value indicating loads in the next clock cycle may be determined based on the first metric value determined for the set of data processing units 120. The processing at block 710 is similar to the processing described in conjunction with block 510 of FIG. 5, which is not repeated herein again.

At block 720, a second total metric value for indicating loads in the current clock cycle may be determined based on previous input data in a previous clock cycle and current input data in a current clock cycle of the set of data processing units 120. According to some embodiments of the present disclosure, for each data processing unit in the set of data processing units 120, previous input data in a previous clock cycle for the data processing unit may be acquired, and a second metric value indicating changes in input data of the data processing unit in the current clock cycle may be determined based on a comparison between the previous input data and current input data. Then, a second total metric value is determined based on the second metric value determined for the set of data processing units. The determination method of the second total metric value is similar to the determination method of the first total metric value. Other details may refer to the related processing described in conjunction with block 510 of FIG. 5, which is not repeated herein again.

At block 730, it is determined whether an absolute value of a difference between the first total metric value and the second total metric value exceeds a third threshold. According to some embodiments of the present disclosure, the third threshold may be dynamically set. For example, in some embodiments, the third threshold may be configured by data processing system 100. In some embodiments, the third threshold may be manually selected based on experiences. In some alternative embodiments, the third threshold may be predetermined.

If it is determined at block 730 that an absolute value of a difference between the first total metric value and the second total metric value exceeds the third threshold, then proceed to block 740, in which at least a portion of the set of data processing units 120 are disabled in the next clock cycle. If it is determined at block 730 that the absolute value of the difference between the first total metric value and the second total metric value is below the third threshold, then proceed to block 750, in which at least a portion of the set of data processing units 120 are enabled in the next clock cycle. According to some embodiments of the present disclosure, the at least a portion of the data processing units 120 may be randomly determined from the set of data processing units 120. According to some alternative embodiments of the present disclosure, the at least a portion of the data processing units 120 may be determined based on a comparison between the first metric value with a predetermined threshold (e.g., in a manner described in conjunction with FIG. 6). In addition, the implementation of disabling and enabling the data processing units is similar to the foregoing description in conjunction with FIG. 5, which is not repeated herein again.

It should be understood that the embodiments described in FIG. 5 to FIG. 7 may be used alone or in any combination. In addition, multiple clock cycles may be selected to complete the control of data processing unit 120. By turning on different data processing units in different clock cycles, it may be achieved that instantaneous high current is distributed to multiple clock cycles. In addition, it may be dynamically adjusted according to actual needs, and the clock control signal of gate_en and the data flow control signal of flow_ctrl are released after dynamic adjustments end, so as to restore to the normal mode.

It can be seen that the manner of controlling loads according to embodiments of the present disclosure is very flexible, and loads may be dynamically and multi-dimensionally adjusted according to the actual situation, so as to meet the requirements of various application scenarios. In addition, the flipped rate of circuits is controlled in a simple gated clock manner, which solves the problem of instantaneous high current and high power consumption without increasing the costs of packaging and PCB. Moreover, control logics required for the entire control is relatively small and the resulting increase in chips area is almost negligible.

Figure 8:
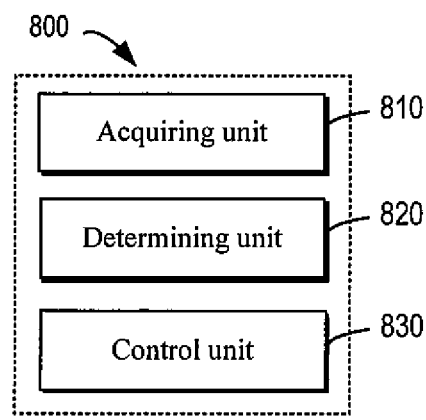
FIG. 8 shows a schematic block diagram of an apparatus for balancing loads according to an embodiment of the present disclosure.

Embodiments of the present disclosure also provide a corresponding apparatus for implementing the foregoing method or process. FIG. 8 shows a schematic block diagram of an apparatus 800 for balancing loads according to an embodiment of the present disclosure. The apparatus 800 may be implemented, for example, at the data processing system 100 of FIG. 1. As shown in FIG. 8, apparatus 800 may include an acquiring unit 810, a determining unit 820, and a control unit 830.

In some embodiments, acquiring unit 810 may be configured to acquire current input data of the data processing unit for a current clock cycle and next input data of the data processing unit for a next clock cycle, for each data processing unit in a set of data processing units (for example, the data processing units 120 of FIG. 1) within a data processing system (for example, the data processing system 100 of FIG. 1). The determining unit 820 may be configured to determine a first metric value indicating changes in input data of the data processing unit in the next clock cycle based on a comparison between the current input data and next input data for each data processing unit in the set of data processing units 120. The control unit 830 may be configured to control an operating state of the set of data processing units in the next clock cycle based on the first metric value determined for the set of data processing units.

In some embodiments, the acquiring unit 810 may include: a selecting unit, configured to select at least one set of input data from a plurality of sets of input data for the data processing unit; and an execution unit, configured to execute said acquiring respectively for each set of input data in the at least one set of input data. In some embodiments, the current input data is one at an output of an input data register (e.g., X input data register 210 of FIG. 2) for the data processing unit, and the next input data is one at an input of the input data register.

In some embodiments, the determining unit 820 may include an exclusive-OR unit, configured to perform an exclusive-OR operation on corresponding bits of the current input data and next input data; and a first metric value determining unit, configured to determine the first metric value based on a result of the exclusive-OR operation of the corresponding bits.

In some embodiments, the control unit 830 may include: a first determining unit, configured to determine a first total metric value indicating loads in the next clock cycle based on the first metric value of each data processing unit in the set of data processing units 120; and a first disabling and enabling unit, configured to disable at least a portion of the set of data processing units 120 in the next clock cycle in response to the first total metric value exceeding a first threshold, and enable at least a portion of the set of data processing units 120 in the next clock cycle in response to the first total metric value being below (i.e., smaller than) the first threshold.

In some alternative embodiments, the control unit 830 may include: a second disabling and enabling unit, configured to disable the data processing unit in the next clock cycle in response to the first metric value of the one data processing unit in the set of data processing units 120 exceeding a second threshold, and enable the data processing unit in response to the first metric value of the data processing unit in the set of data processing units being below the second threshold.

In some alternative embodiments, the control unit 830 may include: a first determining unit, configured to determine a first total metric value for indicating loads in the next clock cycle based on the first metric value determined for the set of data processing units 120; a second determining unit, configured to determine a second total metric value for indicating loads in the current clock cycle based on previous input data in a previous clock cycle and the current input data in the current clock cycle of the set of data processing units 120; and a third disabling and enabling unit, configured to disable at least a portion of the set of data processing units 120 in the next clock cycle in response to an absolute value of a difference between the first total metric value and the second total metric value exceeding a third threshold, and enable at least a portion of the set of data processing units 120 in response to an absolute value of a difference between the first total metric value and the second total metric value being below the third threshold value.

In some embodiments, the second determining unit includes: a data acquiring unit, configured to acquire the previous input data in the previous clock cycle for the data processing unit for each data processing unit in the set of data processing units 120; a second metric value determining unit, configured to determine a second metric value indicating changes in input data of the data processing unit in the current clock cycle based on a comparison between the previous input data and the current input data; a second total metric value determining unit, configured to determine the second total metric value based on the second metric value determined for the set of data processing units 120.

It should be understood that each unit recorded in the apparatus 800 corresponds to each step in the methods of 300-700 described with reference to FIG. 2 to FIG. 7, respectively. Moreover, the apparatus 800 and the operations and features of the units included therein all correspond to the operations and features described above in conjunction with FIG. 2 to FIG. 7, and have the same effect, of which the specific details are not repeated again.

The units included in the apparatus 800 may be implemented in various ways, including software, hardware, firmware, or any combination thereof. In some embodiments, one or more units may be implemented using software and/or firmware, e.g., machine-executable instructions stored on a storage medium. In addition to or as alternatives to machine-executable instructions, some or all of the units in the apparatus 800 may be implemented, at least in part, by one or more hardware logic components. As examples, exemplary types of hardware logic components that may be used include, without limitation: a field programmable gate array (FPGA), an application specific integrated circuit (ASIC), an application specific standard product (ASSP), a system on chip (SOC), a complex programmable logic devices (CPLD), and so on.

These units shown in FIG. 8 may be partially or entirely implemented as hardware modules, software modules, firmware modules, or any combination thereof. In particular, in some embodiments, the processes, methods, or procedures described above may be implemented by hardware in a storage system or a host corresponding to the storage system or other computing devices independent of the storage system.

Figure 9:
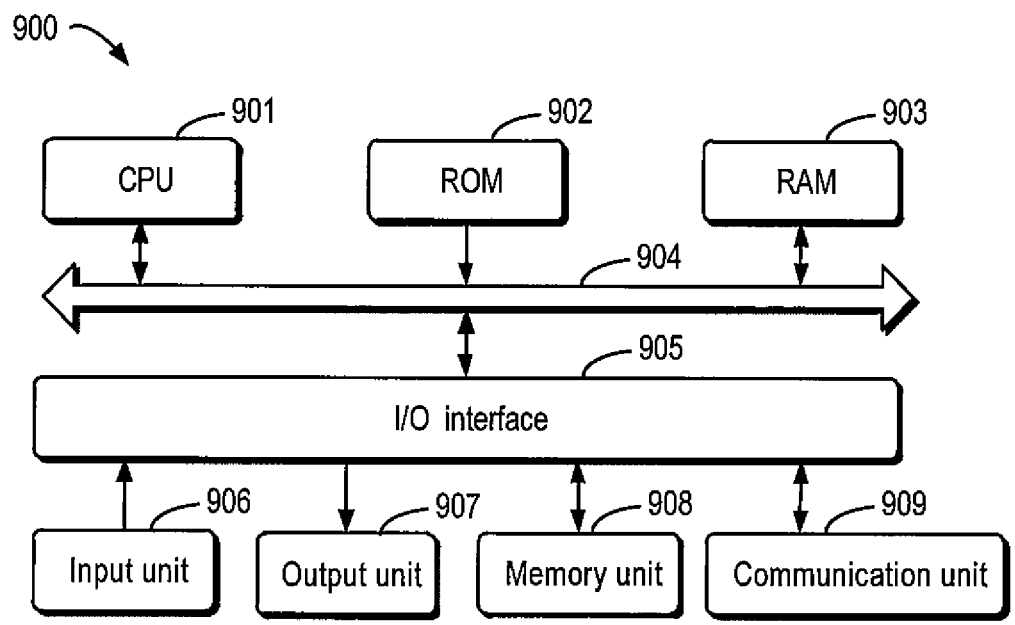
FIG. 9 shows a block diagram of a computing device that may implement embodiments of the present disclosure.

FIG. 9 illustrates a schematic block diagram of an exemplary computing device 900 that may be used to implement embodiments of the present disclosure. The device 900 may be used to implement the data processing system 100 of FIG. 1. As shown in the figure, the device 900 includes a central processing unit (CPU) 901, which may perform various appropriate actions and processes according to computer program instructions stored in a read only memory (ROM) 902 or computer program instructions loaded from a storage unit 908 into a random access memory (RAM) 903. In RAM 903, various programs and data required for the operation of device 900 may also be stored. CPU 901, ROM 902, and RAM 903 are connected to each other through a bus 904. An input/output (I/O) interface 905 is also connected to the bus 904.

A plurality of components in device 900 are connected to the I/O interface 905, including: an input unit 906, e.g., a keyboard, a mouse, etc.; an output unit 907, e.g., various types of displays, speakers, etc.; a storage unit 908, e.g., magnetic disks, an optical disks, etc.; and communication units 909, e.g. network cards, modems, wireless communication transceivers, etc. Communication units 909 allow device 900 to exchange information/data with other devices through a computer network such as the Internet and/or various telecommunication networks.

The processing unit 901 performs various methods and operations described above, such as the methods 300, 500, 600, and 700. For example, in some embodiments, the methods 300, 500, 600, and 700 may be implemented as computer software programs which are tangibly contained in a machine-readable medium, e.g., the storage unit 908. In some embodiments, a part or all of the computer programs may be loaded and/or installed on the device 900 via the ROM 902 and/or the communication units 909. When computer programs are loaded into RAM 903 and executed by CPU 901, one or more steps of the methods 300, 500, 600, and 700 described above may be performed. Alternatively, in other embodiments, CPU 901 may be configured to perform the methods 300, 500, 600, and 700 in any other suitable manner (e.g., by means of firmware).

Program codes for implementing methods of the present disclosure may be written in any combination of one or more programming languages. These program codes may be provided to a processor or controller of a general-purpose computer, special-purpose computer or other programmable data processing apparatus, so that program codes, when executed by the processor or controller, cause the functions/operations specified in the flow charts and/or block diagrams to be performed. The program codes may be executed entirely on a machine, partly on the machine, as a separate software package, partly on the machine, partly on a remote machine, or entirely on the remote machine or server.

In the context of the present disclosure, a machine-readable medium may be a tangible medium that may contain or store a program for use by or in connection with an instruction execution system, apparatus, or device. The machine-readable medium may be a machine-readable signal medium or a machine-readable storage medium. A machine-readable medium may include, but is not limited to, an electronic, magnetic, optical, electromagnetic, infrared, or semiconductor system, apparatus or device, or any suitable combination thereof. More specific examples of the machine-readable storage media would include electrical connections based on one or more wires, a portable computer disk, a hard disk, a random access memory (RAM), a read-only memory (ROM), an erasable programmable read-only memory (EPROM) or a flash memory, an optical fiber, a compact disc read-only memory (CD-ROM), an optical storage device, a magnetic storage device, or any suitable combination thereof.

Furthermore, although operations are depicted in a particular order, it should be understood that these operations are required to be performed in the illustrated particular or sequential order, or that all illustrated operations are required to be performed so as to achieve the desired result. Under certain circumstance, it may be advantageous for multitasking and parallel processing. Likewise, although several specific implementation details are included in the discussion above, these should not be construed as limitations on the scope of the present disclosure. Certain features which are described in the context of separate embodiments may also be implemented in combination in a single implementation. Conversely, various features which are described in the context of a single implementation may also be implemented in multiple implementations separately or in any suitable sub-combination.

Although the present subject matter has been described in language specific to structural features and/or methodological acts, it is to be understood that the subject matter defined in the appended claims is not necessarily limited to the specific features or acts described above. Rather, the specific features and acts described above are merely example forms of implementing the claims.

What is claimed is:

1. A method for balancing loads, comprising:
for each data processing unit in a set of data processing units in a data processing system,
acquiring current input data of the data processing unit for a current clock cycle and next input data of the data processing unit for a next clock cycle; and
determining a first metric value indicating changes in input data of the data processing unit in the next clock cycle based on a comparison between the current input data and the next input data; and
controlling an operating state of the set of data processing units in the next clock cycle based on the first metric value determined for the set of data processing units;
wherein controlling the operating state of the set of data processing units comprises at least one of:
(i) determining a first total metric value indicating loads in the next clock cycle based on the first metric value of each data processing unit in the set of data processing units; in response to the first total metric value exceeding a first threshold, disabling at least a portion of the set of data processing units in the next clock cycle; and in response to the first total metric value smaller than the first threshold, enabling at least a portion of the set of data processing units in the next clock cycle; or
(ii) in response to the first metric value of a first data processing unit in the set of data processing units exceeding a second threshold, disabling the first data processing unit in the next clock cycle; and in response to the first metric value of the first data processing unit in the set of data processing units smaller than the second threshold, enabling the first data processing unit in the next clock cycle; or
(iii) determining a first total metric value for indicating loads in the next clock cycle based on the first metric value determined for the set of data processing units, determining a second total metric value for indicating loads in the current clock cycle based on previous input data in a previous clock cycle and the current input data in the current clock cycle of the set of data processing units, in response to an absolute value of a difference between the first total metric value and the second total metric value exceeding a third threshold, disabling at least a portion of the set of data processing units in the next clock cycle, and in response to the absolute value of the difference between the first total metric value and the second total metric value smaller than the third threshold, enabling at least a portion of the set of data processing units in the next clock cycle.

2. The method according to claim 1, wherein acquiring the current input data and the next input data comprises:
selecting at least one set of input data from a plurality of sets of input data for the data processing unit; and
acquiring the current input data and the next input data for each set of input data in the at least one set of input data respectively.

3. The method according to claim 1, wherein the current input data is data at an output of an input data register for the data processing unit, and the next input data is data at an input of the input data register.

4. The method according to claim 1, wherein determining the first metric value comprises:
performing an exclusive-OR operation on corresponding bits of the current input data and next input data; and
determining the first metric value based on a result of the exclusive-OR operation performed on the corresponding bits.

5. The method according to claim 1, wherein determining the second total metric value comprises:
for each data processing unit in the set of data processing units,
acquiring the previous input data in the previous clock cycle for the data processing unit; and
determining a second metric value indicating changes in input data of the data processing unit in the current clock cycle based on a comparison between the previous input data and the current input data; and
determining the second total metric value based on the second metric value determined for the set of data processing units.

6. An apparatus for balancing loads, comprising:
one or more processors;
a memory storing instructions executable by the one or more processors;
wherein the one or more processors are configured to:
acquire current input data of the data processing unit for a current clock cycle and next input data of the data processing unit for a next clock cycle, for each data processing unit in a set of data processing units in a data processing system;
determine a first metric value indicating changes in input data of the data processing unit in the next clock cycle based on a comparison between the current input data and the next input data, for each data processing unit in the set of data processing units; and
control an operating state of the set of data processing units in the next clock cycle based on the first metric value determined for the set of data processing units;
wherein the one or more processors are further configured to execute at least one of:
(i) determining a first total metric value indicating loads in the next clock cycle based on the first metric value of each data processing unit in the set of data processing units; in response to the first total metric value exceeding a first threshold, disabling at least a portion of the set of data processing units in the next clock cycle; and in response to the first total metric value smaller than the first threshold, enabling at least a portion of the set of data processing units in the next clock cycle; or
(ii) in response to the first metric value of a first data processing unit in the set of data processing units exceeding a second threshold, disabling the first data processing unit in the next clock cycle; and in response to the first metric value of the first data processing unit in the set of data processing units smaller than the second threshold, enabling the first data processing unit in the next clock cycle; or
(iii) determining a first total metric value for indicating loads in the next clock cycle based on the first metric value determined for the set of data processing units, determining a second total metric value for indicating loads in the current clock cycle based on previous input data in a previous clock cycle and the current input data in the current clock cycle of the set of data processing units, in response to an absolute value of a difference between the first total metric value and the second total metric value exceeding a third threshold, disabling at least a portion of the set of data processing units in the next clock cycle, and in response to the absolute value of the difference between the first total metric value and the second total metric value smaller than the third threshold, enabling at least a portion of the set of data processing units in the next clock cycle.

7. The apparatus according to claim 6, wherein the one or more processors are configured to:
   select at least one set of input data from a plurality of sets of input data for the data processing unit; and
   acquire the current input data and the next input data for each set of input data in the at least one set of input data respectively.

8. The apparatus according to claim 6, wherein the current input data is data at an output of an input data register for the data processing unit, and the next input data is data at an input of the input data register.

9. The apparatus according to claim 6, wherein the one or more processors are configured to:
   perform an exclusive-OR operation on corresponding bits of the current input data and next input data; and
   determine the first metric value based on a result of the exclusive-OR operation performed on the corresponding bits.

10. The apparatus according to claim 6, wherein the one or more processors are configured to:
    acquire the previous input data in the previous clock cycle for the data processing unit for each data processing unit in the set of data processing units;
    determine a second metric value indicating changes in input data of the data processing unit in the current clock cycle based on a comparison between the previous input data and the current input data;
    determine the second total metric value based on the second metric value determined for the set of data processing units.

11. A non-transitory computer-readable storage medium having a computer program stored thereon which, when executed by a processor, implements a method for balancing loads, wherein, the method comprises:
    for each data processing unit in a set of data processing units in a data processing system,
       acquiring current input data of the data processing unit for a current clock cycle and next input data of the data processing unit for a next clock cycle; and
       determining a first metric value indicating changes in input data of the data processing unit in the next clock cycle based on a comparison between the current input data and the next input data; and
    controlling an operating state of the set of data processing units in the next clock cycle based on the first metric value determined for the set of data processing units;
    wherein controlling the operating state of the set of data processing units comprises at least one of:
    (i) determining a first total metric value indicating loads in the next clock cycle based on the first metric value of each data processing unit in the set of data processing units; in response to the first total metric value exceeding a first threshold, disabling at least a portion of the set of data processing units in the next clock cycle; and in response to the first total metric value smaller than the first threshold, enabling at least a portion of the set of data processing units in the next clock cycle; or
    (ii) in response to the first metric value of a first data processing unit in the set of data processing units exceeding a second threshold, disabling the first data processing unit in the next clock cycle; and in response to the first metric value of the first data processing unit in the set of data processing units smaller than the second threshold, enabling the first data processing unit in the next clock cycle; or
    (iii) determining a first total metric value for indicating loads in the next clock cycle based on the first metric value determined for the set of data processing units, determining a second total metric value for indicating loads in the current clock cycle based on previous input data in a previous clock cycle and the current input data in the current clock cycle of the set of data processing units, in response to an absolute value of a difference between the first total metric value and the second total metric value exceeding a third threshold, disabling at least a portion of the set of data processing units in the next clock cycle, and in response to the absolute value of the difference between the first total metric value and the second total metric value smaller than the third threshold, enabling at least a portion of the set of data processing units in the next clock cycle.

* * * * *